United States Patent [19]

Archibald et al.

[11] Patent Number: 4,488,072
[45] Date of Patent: Dec. 11, 1984

[54] GENERATOR STATOR FRAME WITH INTEGRAL HIGH-VOLTAGE BUSHINGS

[75] Inventors: James B. Archibald; Frederick J. Rink, Jr., both of Schenectady, N.Y.

[73] Assignee: General Electric Company, Schenectady, N.Y.

[21] Appl. No.: 502,085

[22] Filed: Jun. 8, 1983

[51] Int. Cl.³ ............................................. H02K 11/00
[52] U.S. Cl. ...................................... 310/71; 310/89; 310/91
[58] Field of Search ............... 310/71, 91, 254, 256, 310/258, 89, 51; 339/93 R, 93 C; 336/90

[56] References Cited

U.S. PATENT DOCUMENTS

| 3,803,523 | 4/1974 | Farmer et al. | 336/90 |
| 3,902,774 | 9/1975 | Gronholm | 310/68 |
| 4,172,984 | 10/1979 | Daugherty | 310/71 |
| 4,254,352 | 3/1981 | Fidei et al. | 310/71 |

FOREIGN PATENT DOCUMENTS

| 1330434 | 5/1963 | France | 310/71 |
| 725211 | 3/1955 | United Kingdom | 310/71 |

Primary Examiner—J. D. Miller
Assistant Examiner—D. L. Rebsch
Attorney, Agent, or Firm—John F. Ahern; Paul Checkovich

[57] ABSTRACT

A terminal plate is permanently affixed to a stator frame below the connector rings. High-voltage bushings are installed in the terminal plate at the user's site. Conducting bars are employed between each connector ring and its respective high-voltage bushing. Each conducting bar terminates at a short tangential distance from a connecting portion of its related high-voltage bushing. Domed flexible straps interconnect the conducting bars with the high-voltage bushings, the domed portions of the straps oriented to absorb relative motion engendered by tangential forces on the stator core and connector rings.

5 Claims, 6 Drawing Figures

GENERATOR STATOR FRAME WITH INTEGRAL HIGH-VOLTAGE BUSHINGS

The present invention relates to improved turbogenerator structure and, in particular, to improved structure for the output bushing arrangements thereof.

The stator of the generator of a turbine-generator set is the largest single piece of equipment which comprises the many parts which are separately shipped to a power plant site and assembled there. Very large turbogenerator stators may be as large as 13 feet in diameter and 35 feet in length and may weigh as much as 250 tons. Such large sizes pose problems in shipping such stator assemblies due to limited dimensions in tunnels, bridge underpasses and other obstructions. For this purpose special types of railroad cars which have unique configurations, permitting the stator to ride as close to the rails as possible are used. It nevertheless becomes necessary in shipping large generator stator assemblies to remove any protuberances which are normally affixed to the generator frame during operation, which protuberances are in excess of the cylindrical dimension of the stator frame itself.

One such protuberance is the lower frame extension which houses the high-voltage, high-current bushings which carry the electrical output of the generator and may be as large as 6'×10'×4' and weigh as much as one ton. The bushings may vary from three to six in number for a three-phase, polyphase generator, depending upon the manner in which the neutral busses are arranged.

In turbogenerators, the lower frame extension spaces the high-voltage bushings apart an appropriate distance to prevent arcing and is quite complex. Yet another reason for the size and complexity of the lower frame extension is the requirement for flexible connectors between the bushing assembly and the generator connection rings. These flexible connectors are required due to the fact that the armature bars expand axially due to thermal expansion at high electrical loads and that the entire core winding end assembly may rotate a small but finite amount under the influence of magnetic forces developed under heavy load. The connection rings are rigidly mounted to the end windings and thereby undergo some axial and circumferential motion. This motion is absorbed by the flexible connectors. Although present flexible connector means in the generator lower frame extension is principally for absorbing axial motion, there is a significant requirement for flexibility in the circumferential direction due to the flexure of the generator connection rings which is caused by the electromechanical interactions between the generator stator and rotor. Additionally, sudden shocks due to load-shedding or transient disturbances in the line fed by the generator can cause sudden circumferential forces and resultant circumferential motion of the generator connection rings.

Yet another reason for the size and complexity of lower frame extensions is the requirement that it contain means for forced fluid cooling of the bushings and attendant connectors. This requirement does not occur in all generators, nor even in all turbogenerators. Generators which operate at relatively low powers, for example, those which are rated at a power of less than 200 MVA (at 24,000 volts) are normally cooled by the passage of the ambient cooling gas through the generator casing. This cooling gas is normally sufficient to cool the high-voltage bushings for the generator which may therefore conveniently be located essentially within the generator frame, obviating the need for a lower frame extension and all of the complicated support means and other instrumentalities which are attendant with forced fluid cooling.

From approximately 200 MVA to 1000 MVA, it is usually necessary and adequate to cool the high-voltage bushings of a turbogenerator by the passage of cooling gas as, for example, hydrogen which is forced to flow through tubulations and hollow sections within the high-voltage bushings of the generator and the attendant conductors. At power levels in excess of 1000 MVA, it is usually necessary to force-cool the high-voltage bushings and the attendant conductors associated therewith by the passage of a liquid as, for example, water through similar hollow passages within the bushings and other conductors.

Thus, the lower frame extension spaces the high-voltage bushings downward from the main body of the stator frame and thus requires a relatively complicated piping for feeding cooling fluid to the high-voltage bushings. Stand-off insulators are required to support this piping and to provide a non-conducting gas passage to the plenum.

As the generator load increases, the armature bars grow due to thermal expansion, and the core rotates under the influence of magnetic forces. The connection rings are rigidly mounted to the end winding and thereby undergo motion in the axial and circumferential directions. Most of this motion is absorbed by flexible connectors which are used to connect the connection rings to the stand-off insulators. Some of the motion, particularly the circumferential motion occurring during load surges, is absorbed by the elastically mounted stand-off insulators.

From the foregoing, it may be appreciated that the lower frame extension is a complex and large assembly. The disadvantages of the requirement for a detachable lower frame extension are compounded by the requirement that the extension be shipped separately from the generator and assembly must be accomplished at the site where the facilities and personnel available for reassembly of the lower frame extension with the generator frame are not as well suited for such assembly as would be at the factory at which the generator is built. Additionally, since this large mass is asymmetrical with respect to the cylindrical generator frame, it is a source of unwanted vibration during operation of the generator.

It is therefore an object of the present invention to provide an electric generator which eliminates the need for a lower frame extension to support high-voltage bushings which are cooled by the passage of a fluid therethrough.

It is a further object of the invention to provide an integral terminal plate directly affixed to the lower surface of a stator frame which accepts on-site installation of high-voltage bushings.

It is a further object of the invention to provide a shorter, more direct current path between connecting rings and high-voltage bushings of an electric turbogenerator.

It is a further object of the invention to provide flexible interconnection between a turbogenerator connecting ring assembly and the high-voltage bushings therefor which is principally flexible in the tangential direction with respect to the turbogenerator.

Still another object of the invention is to provide forced gas cooling within the bushings of a high-power turbogenerator without the use of bulky stand-off insulators or downwardly depending lower flexible current leads.

According to an aspect of the present invention, there is provided an electric generator of the type having a rotor and a stator, comprising a stator frame enclosing the stator, the stator frame having a bottom surface, the stator including connector rings, a terminal plate sealingly affixed to the bottom surface below the connecting rings, a plurality of high-voltage bushings installable to sealingly extend through the terminal plate, the high-voltage bushings including an inner portion within the stator frame, the inner portions each including a connecting portion, at least one conducting bar extending from each one of the connector rings to a position spaced from one of the connecting portions, and flexible connecting means for connecting an end of each of the conducting bars to its spaced connecting portion.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
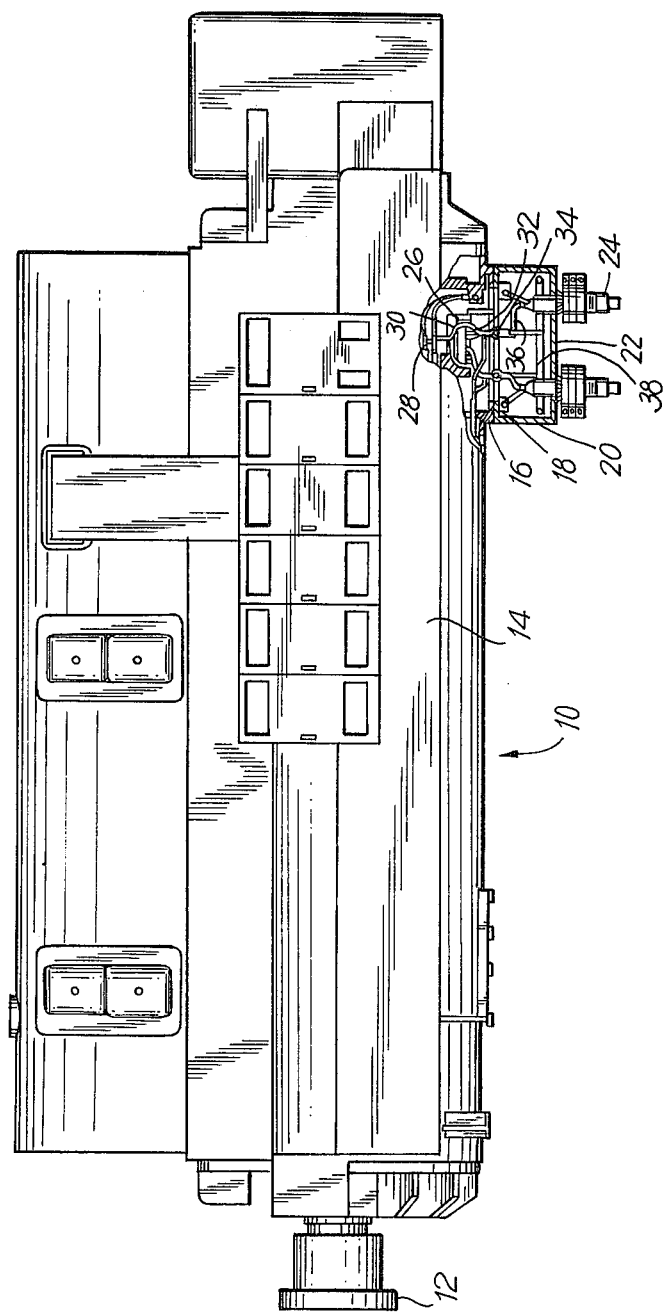
FIG. 1 is a side view, partially cut away of an electric generator according to the prior art.

Referring now to FIG. 1, a conventional generator is shown, generally at 10. Generator 10 is coupled to a steam turbine (not shown) by a bolted flange 12 for turning a rotor (not shown) inside generator 10. A stator frame 14 encloses generator 10. A mounting flange 16 mates with a mounting flange 18 of a lower frame extension 20. Lower frame extension 20 is separated from stator frame 14 for shipment in order to reduce the shipping envelope of generator 10 and is installed during the installation process at the user's site.

Lower frame extension 20 includes a bottom wall 22 through which a plurality of high-voltage bushings 24 are sealingly mounted. Lower frame extension 20 and the interior of stator frame 14 form a sealed enclosure for retaining pressurized coolant gas such as, for example, hydrogen gas at a pressure of about 75 PSI, for example.

Six connector rings 26 encircle the stator to receive three-phase power from stator bars 28 by conventional interconnections 30. Each connector ring 26 is coupled to a high-voltage bushing 24 by a conductor 32, three pairs of vertically disposed domed flexible straps 34, a stand-off insulator (not shown), and a hollow tube 36. High-voltage bushing 24 receives gas from environment through an inlet tube not shown. The gas travels through high-voltage bushing 24, through hollow tube 36, and exits through the stand-off insulator.

Figure 2:
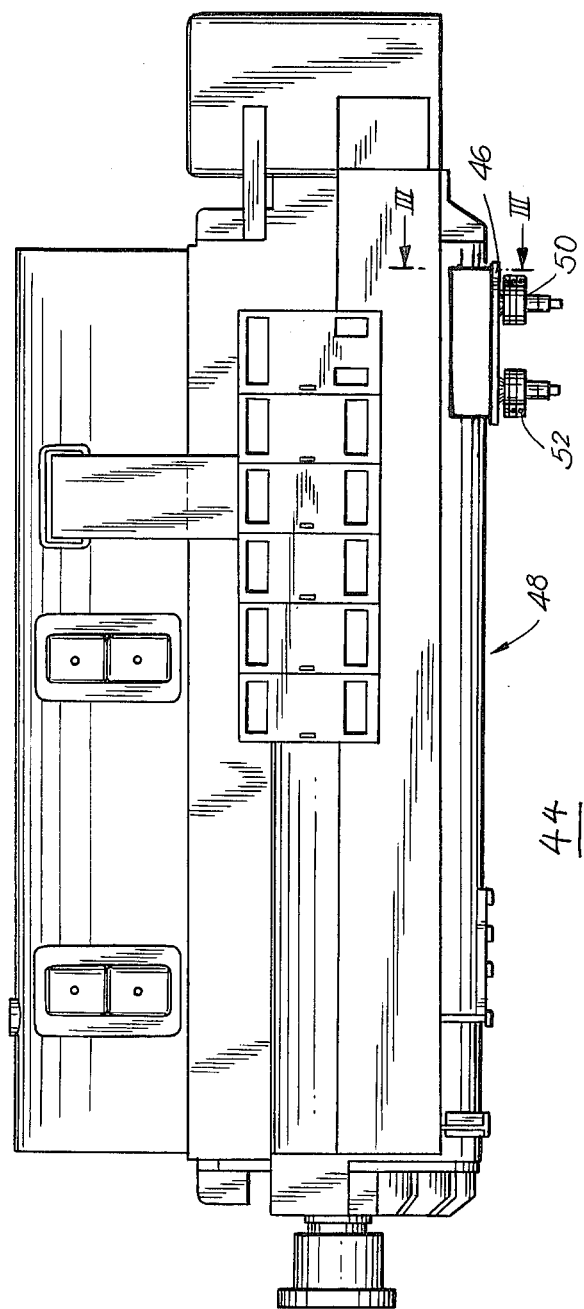
FIG. 2 is a side view of the end portion of an electric generator embodying integral high-voltage bushings according to the present invention.

Referring now to FIG. 2, a generator 44 is shown according to an embodiment of the invention. A terminal plate 46 is permanently welded to a stator frame 48 by means of terminal enclosure 43, having side walls 47. A plurality of high-voltage bushings 50 are removable for shipment and installed during erection of the system. Current transformers 52 encircle each high-voltage bushing for conventional use in a generator protection system. In accordance with this invention the high-voltage bushings 50 are spaced more closely to one another than in comparable generators of prior art. We have discovered that it is practical to space high-voltage bushings 50 close enough to permit complete elimination of the lower frame extension without incurring additional problems. In some cases, smaller current transformers 52 may be required. However, such smaller current transformers are feasible and operate satisfactorily with the system.

Figure 3:
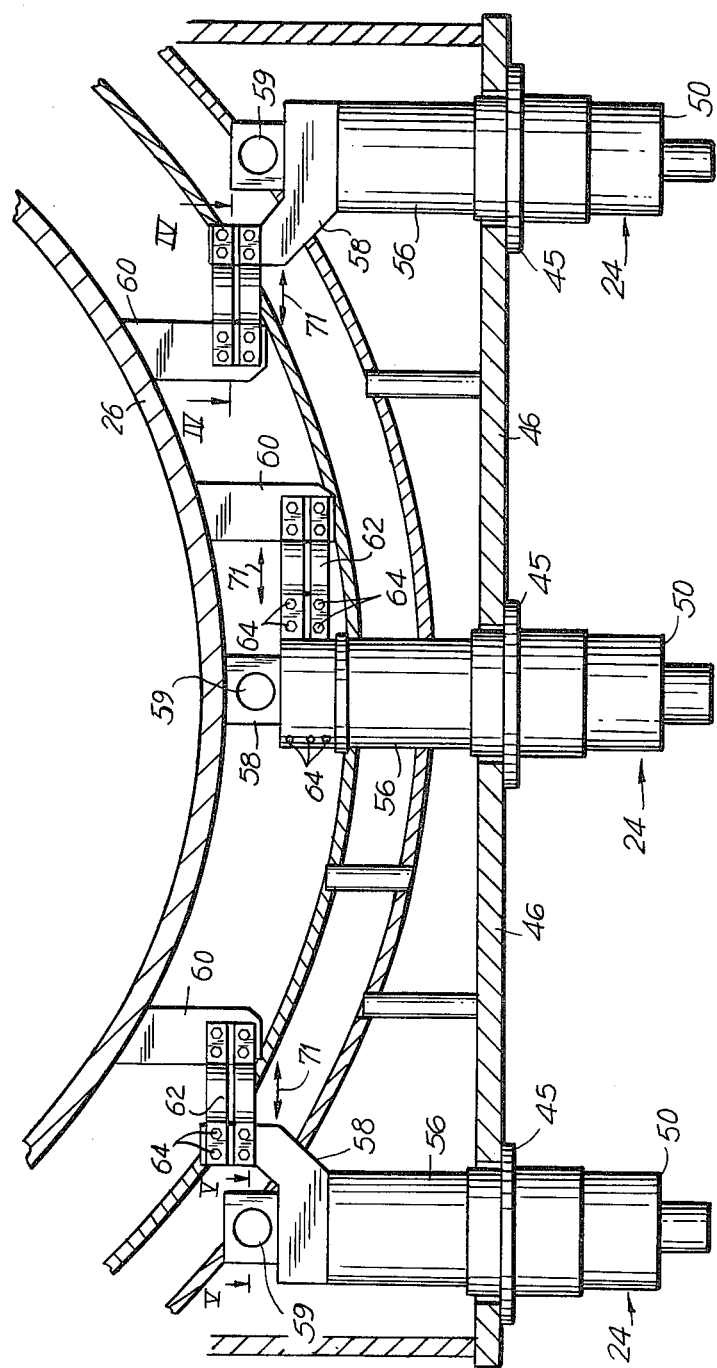
FIG. 3 is a cross section taken along III—III of FIG. 2.

Referring now to FIG. 3, it will be seen that high-voltage bushings 50 are sealed to terminal plate 46 by an integral sealing flange 45. Although any attachment method may be used, such as, for example, welding, bolting of sealing flange 45 to terminal plate 46 of terminal enclosure 43, having sidewalls 47 and endwalls (not shown) is preferred. Terminal enclosure 43 is affixed by welding of sidewalls 47 and endwalls (not shown) to stepped outer wrapper plate 51 of generator frame 48, which wrapper are welded together at a region surrounding, but removed from terminal enclosure 43. A rectangular opening in the wrapper plates allows free passage of bushings 50. Main and stepped outer wrappers are spaced apart by plurality of support and spacer members, one of which is illustrated at 53. Terminal plate 46 is spaced apart from stepped outer wrapper plate 51 by a plurality of terminal plate spacer member 55. An inner portion 56 of high-voltage bushing 50 terminates in a connecting portion 58 (see also FIG. 3). Rigid conducting bars 60 extend downward from respective connector rings 26, to which they are affixed, respectively, to align with respective connecting portions 58. Since connector rings 26 are coaxial and of the same radius, being axially offset from each other, only one of them being illustrated in FIG. 3. The high-voltage bushings 50 are arranged specially so as to optimize the insulation properties of the gaseous environment, therefore conducting bars 60 must be bent or slanted to align with their respective connecting portions 58. Domed flexible straps 62 are affixed to each side of conducting bar 60 and bridge the gap to their associated connecting portions 58. Flexible straps 62 are affixed at each end by any convenient means such as, for example, by bolts 64.

Figure 4:
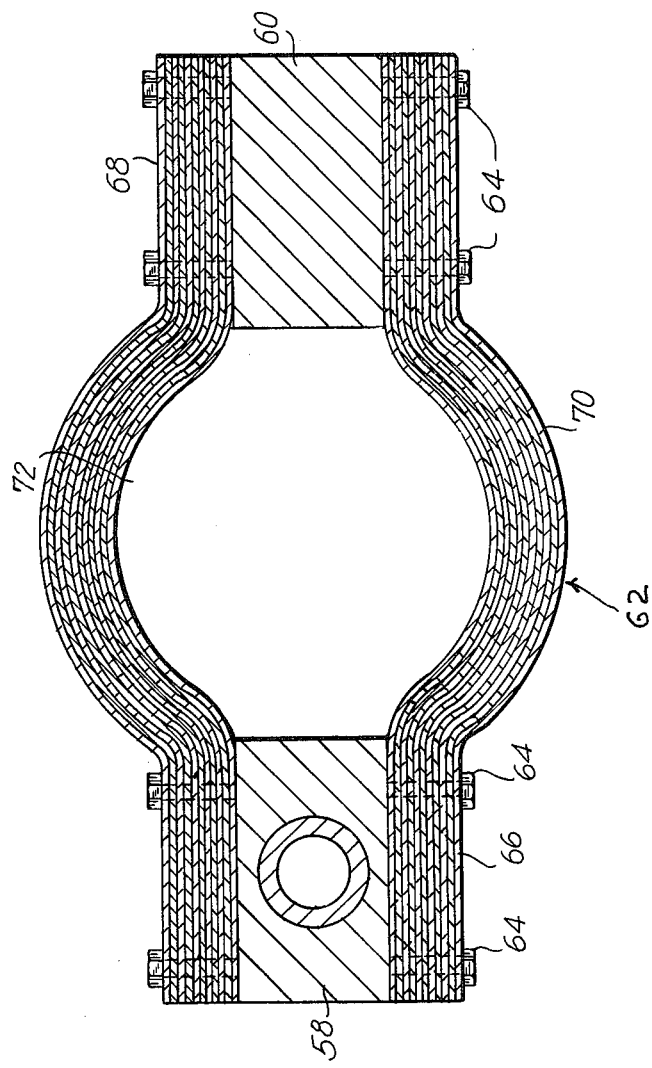
FIG. 4 is a cross section taken along IV—IV of FIG. 3.

Referring momentarily to FIG. 4, it will be seen that flexible strap 62 includes flat end portions 66 and 68 affixed respectively to connecting portion 58 and conducting bar 60 with a domed portion 70 in a gap 72 between connecting portion 58 and conducting bar 60.

It will be recognized that domed portions 70 provide substantial ability for flexible straps 62 to absorb relative motion of conducting bar 60 toward and away from connecting portion 58.

Referring again to FIG. 3, the tangential motion of connector rings 26 produces back and forth motion as indicated by double-headed arrows 71 at the outer ends of conducting bars 60. Thus, the tangential orientation of domed flexible straps with respect to the stator is favorable for absorption of this motion, much more so than the flexible means used in bushing assemblies of the prior art, which are radial with respect to the stator.

It will be noted that two pairs of flexible straps 62 are employed on each high-voltage bushing 50. More or fewer pairs of flexible straps 62 may be employed depending on the power being carried and the permissible temperature rise.

High-voltage bushings are customarily cooled by gas or fluid flow to limit the temperature rise therein due to $I^2R$ heating. In addition, it is customary to cool connector rings 26 as well as conducting bars 60. The embodiment of the invention in FIG. 3 is particularly well suited to cooling connections. Gas enters high-voltage bushing 24 through an inlet duct 35 (see FIG. 5) of a compound snorkel 59. The gas travels through the bushing 24 and immediately exits through a nonconductive exhaust duct 39 (see FIG. 5) of snorkel 59.

Outlet duct 39 is nonconducting. Inlet duct 35 is open to the ambient hydrogen cooling environment within the generator, but outlet tube 39 is connected to the generator cooling exhaust fan 80 so that the flow of coolant gas through the bushing, shown by arrows 41 in FIGS. 5 and 6, which is a vertical cross-sectional view of snorkel 59 and the top of high-voltage bushing 50, is characterized as forced flow cooling.

Figure 5:
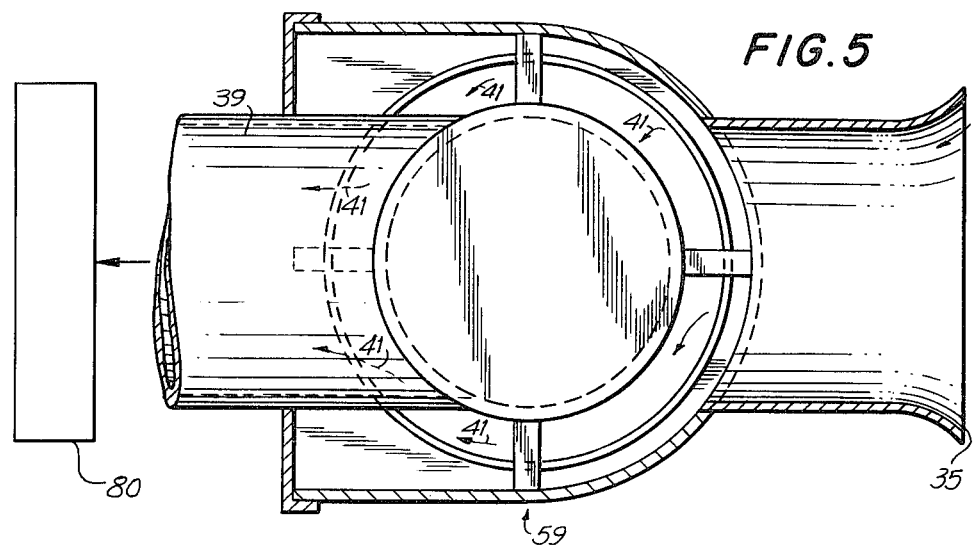
FIG. 5 is a cross-sectional view taken along V—V of FIG. 3 and illustrates the construction of the gas flow snorkel which provides coolant gas flow to and removes the same from the main bushings.

FIG. 5 is a horizontal plan view of the top of bushing connecting portion taken along section lines V—V in FIG. 3 which shows in detail the means for cooling high-voltage bushing 50.

Figure 6:
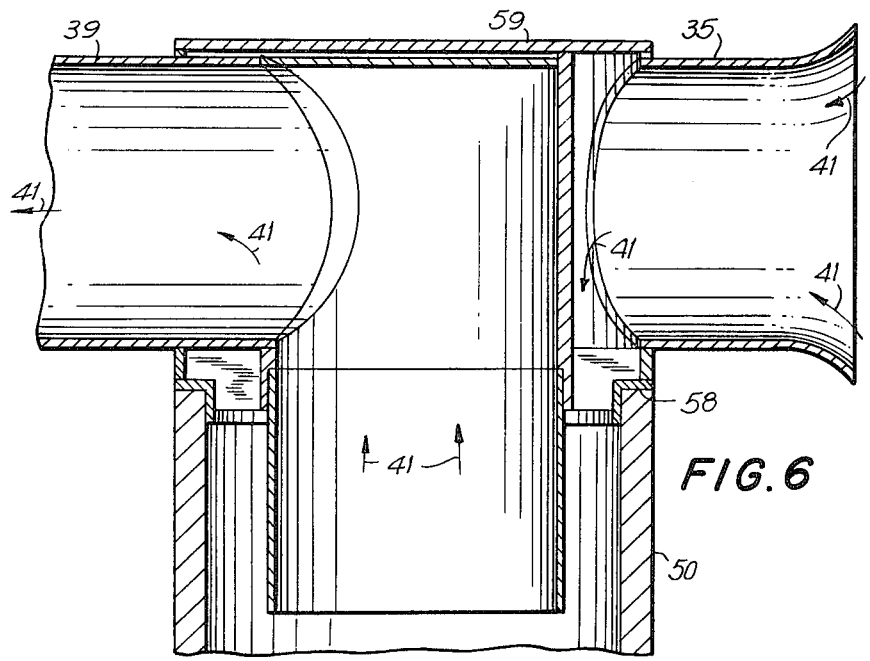
FIG. 6 is a vertical cross-sectional view of the snorkel illustrated in FIG. 5.

FIG. 6 shows in vertical section the connection of snorkel 59 to connecting portion 58 of high-voltage bushing 50.

The specific gas or fluid flow paths and connections shown in FIG. 3 are illustrative only and should not be taken to limit the invention. Other connections and flow paths may be equally employed without departing from the spirit of the invention. For example, separate coolant feed and return lines may be employed for high-voltage bushings 50 and for conducting bars 60 and their associated connector rings 26. In addition, a mixed gas and fluid system may be employed with one medium cooling high-voltage bushings 50 and the other medium cooling conducting bars 60 and connector rings 26. For high rated machines, above 1000 MVA, the entire system may utilize cooling by water.

Thus, in accord with the present invention, we have not only been able to eliminate, from highly rated turbogenerators (e.g., 200 MVA) the lower frame extension which, in the prior art had to be shipped separately and assembled in the field, but we have simplified the high-voltage bushing assembly by eliminating the stand-off insulators of the prior art, simplified the forced fluid cooling arrangement, and relocated the flexible connector straps in a position tangential to the connector rings of the turbogenerator, thus optimizing the flexibility of the bushing assembly to absorb relative tangential motion between the end turn and connector ring assembly without losing flexibility of the end assembly to axial flexure with thermal expansion of the armature bars.

In accord with our invention, the only part of the bushing assembly which must be assembled to the generator on site are the bushings themselves. Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. An electric generator of the type having a rotor and a stator, comprising:
   a stator frame enclosing said stator, said stator frame having a bottom surface;
   said stator including connector rings connected to armature bars of phase windings of said stator;
   a terminal plate assembly permanently affixed to said bottom surface below said connector rings;
   a plurality of high-voltage bushings;
   means for sealingly installing said plurality of high-voltage bushings in said terminal plate assembly;
   said means for sealingly installing including means for permitting removal of said plurality of high-voltage bushings at least for shipment of said stator frame;
   each of said high-voltage bushings including an inner portion disposed within said stator frame when said high voltage bushings are sealingly installed in said terminal plate assembly;
   said inner portions each including a connecting portion;
   at least one conducting bar extending from each one of said connector rings to a position tangentially spaced from one of said connecting portions; and
   flexible connecting means tangentially disposed with respect to said connector rings for connecting an end of each of said conducting bars to its respective tangentially spaced connecting portion.

2. An electric generator according to claim 1, wherein said flexible connecting means include means for absorbing tangential relative motion between said conducting bar and said connecting portion.

3. An electric generator according to claim 2, wherein said flexible connecting means includes first and second end portions, said first and second end portions being adapted for conductive attachment to said conducting bar and said connecting portion respectively, and a flexible domed portion intermediate said first and second end portions.

4. An electric generator according to claim 1 and further including nonconducting duct means for removing cooling fluid from said bushings.

5. An electric generator of the type having a rotor and a stator, comprising:
   a stator frame enclosing said stator, said stator frame having a bottom surface;
   said stator including connector rings connected to armature bars of phase windings of said stator;
   a terminal plate assembly permanently affixed to said bottom surface below said connector rings;
   a plurality of high-voltage bushings;
   means for sealingly installing said plurality of high-voltage bushings in said terminal plate assembly;
   said means for sealingly installing including means for permitting removal of said plurality of high-voltage bushings at least for shipment of said stator frame;
   each of said high-voltage bushings including an inner portion disposed within said stator frame when said high voltage bushings are sealingly installed in said terminal plate assembly;
   said inner portions each including a connecting portion;

at least one conducting bar extending from each one of said connector rings to a position tangentially spaced from one of said connecting portions;

flexible connecting means tangentially disposed with respect to said connector rings for connecting an end of each of said conducting bars to its respective tangentially spaced connecting portion;

nonconducting duct means for removing cooling fluid from said bushings; and said nonconducting duct means includes a non-conductive exhaust duct leading to an intake side of a generator cooling fan whereby forced fluid coolant is drawn through said bushings.

* * * * *